United States Patent
Suzuki et al.

(10) Patent No.: US 6,796,834 B2
(45) Date of Patent: Sep. 28, 2004

(54) WIRE HARNESS-WIRING SLIDING PART

(75) Inventors: Shigeru Suzuki, Yokkaichi (JP); Yoshinao Kobayashi, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/188,731

(22) Filed: Jul. 2, 2002

(65) Prior Publication Data

US 2003/0008533 A1 Jan. 9, 2003

(30) Foreign Application Priority Data

Jul. 4, 2001 (JP) ........................................ 2001-203129

(51) Int. Cl.[7] ............................................. H01R 13/73
(52) U.S. Cl. ..................................... 439/545; 439/933
(58) Field of Search ................................ 439/545, 200, 439/943, 933

(56) References Cited

U.S. PATENT DOCUMENTS

| | | | | |
|---|---|---|---|---|
| 2,844,806 A | * | 7/1958 | Mckissick ..................... | 439/522 |
| 3,644,066 A | * | 2/1972 | Heob et al. ................... | 439/870 |
| 5,391,835 A | * | 2/1995 | Yao et al. ..................... | 439/559 |
| 5,590,938 A | * | 1/1997 | De Andrea .................... | 439/61 |
| 5,626,785 A | * | 5/1997 | Rajnik ......................... | 439/886 |
| 5,657,544 A | * | 8/1997 | Ota et al. ..................... | 338/32 |

* cited by examiner

Primary Examiner—P. Austin Bradley
Assistant Examiner—Briggitte R. Hammond
(74) Attorney, Agent, or Firm—Harness, Dickey & Pierce, P.L.C.

(57) ABSTRACT

A wire harness-wiring sliding part has a sliding part (12) and a rail member (11) on which the sliding part (12) is mounted. The rail member (11) has a pair of opposing guide rail portions (11b) longitudinally disposed opposing each other at a predetermined distance. The sliding part (12) has a holding portion (12a), on both its sides, which hold edges of the opposing guide rail portions (11b). The sliding part (12) is longitudinally slidable on the guide rail portions (11b). A wire harness (14), extending from a vehicle body, is wired from a vehicle body provided with the rail member (11) to a sliding door provided with the sliding part (12). A felt material (13) is installed on an inner surface (12b) of each of the holding portions (12a) of the sliding part (12) in a direction orthogonal to a longitudinal direction of the rail member (11). The felt material fills a gap between the inner surface (12b) and a peripheral surface of an end portion of the guide rail portion (11b).

3 Claims, 3 Drawing Sheets

WIRE HARNESS-WIRING SLIDING PART

CROSS-REFERENCE TO RELATED APPLICATIONS

This application claims priority to Japanese Patent Application No. 2001-203129 filed Jul. 4, 2001, which application is hereby expressly incorporated by reference.

FIELD OF THE INVENTION

The present invention relates to a wire harness-disposing sliding part that is used to dispose a wire harness between a vehicle body and a sliding door movable relatively to the vehicle body.

BACKGROUND OF THE INVENTION

Vehicles with sliding door construction, are provided with a continuous feeding system where a wire harness is disposed between the vehicle body and the sliding door. As shown in FIGS. 7 and 8, a wire harness disposing unit is used in the continuous feeding system. The wire harness disposing unit has a rail member 1 and a sliding part 2 mounted on the rail member 1. The sliding part 2 is slidable in a longitudinal direction of the rail member 1.

More specifically, the wire harness disposing unit rail member 1 has a rectangular extruded metal material and an expanding slot 1a. The slot 1a has a predetermined width and extends in the longitudinal direction on one side surface. The wire harness disposing unit also includes the sliding part 2. The sliding part 2 has a holding portion 2a on both sides holding edges of a pair of flat guide rail portions 1b. The edges of the flat guide rail portions 1b fit on the holding portion 2a. The edges of the flat guide rail portions 1b confront each other at the position of the expanding slot of the rail member 1. The holding portion 2a is slidable in the longitudinal direction of the guide rail portion 1b.

The rail member 1 is fixed to an appropriate position of the vehicle body. The sliding part 2, fixed to an appropriate position of the sliding door, is slidably mounted on both guide rail portions 1b. The sliding part 2 slides over the guide rail portions 1b. Accordingly, during a sliding operation, the sliding part 2 slides along the guide rail portions 1b.

By utilizing a grommet, a wire harness 4 extends from the vehicle body. The wire harness 4 passes through a grommet and is wired inside the rail member 1 through an unshown insertion opening formed on a side surface 1c opposite to the expanding slot 1a. The wire harness 4 is wired from the inside of the rail member 1 to the sliding door through an insertion opening formed on the sliding part 2. A loose portion 4a of the wire harness 4 remains inside a space of the rail member 1. The length of the loose portion 4a is set so that a smooth sliding movement of the sliding part 2 is achieved in the longitudinal direction of the rail member 1.

The wire harness 4, inside the rail member 1, has a flat cable construction to make the wire harness 4 flexible. Thus the U-shaped loose portion 4a is formed inside the rail member 1. The sliding part 2 which slides along the guide rail portion 1b of the rail member 1 is made of a metal material or a resinous material with superior wear resistance.

However when the sliding part 2 slides along the rail member 1, noise is generated due to the sliding of the sliding part 2 along the rail member 1. Also, an impact noise is generated due to the presence of a gap. Thus, a resinous material tends to be used for the sliding part 2 because it is superior in sound-proof and sound absorption.

However, the use of the resinous material superior in sound-proof and sound absorption can reduce the sliding-caused noise and the impact noise to some extent. In recent years, vehicles are less noisy. Thus the resinous material is not effective for reducing the sliding-caused noise and the impact noise. Therefore there is a growing demand for the use of other suitable materials and improvement of the construction of the wire harness-wiring sliding part.

SUMMARY OF THE INVENTION

The present invention has been made in view of the above disadvantages. Accordingly, it is an object of the present invention to provide a wire harness-wiring sliding part capable of effectively reducing a sliding-caused noise or an impact noise.

The present invention provides a wire harness-wiring sliding part including a sliding part and a rail member on which the sliding part is mounted. The rail member has a pair of confronting guide rail portions longitudinally disposed in confrontation with each other at a predetermined interval. The sliding part has a holding portion on both sides. The sliding part holds edges of the opposing guide rail portions and is longitudinally slidable. A wire harness extends from a vehicle body. The wire harness is wired from a vehicle body provided with the rail member to a sliding door provided with the sliding part through the sliding part. A felt material is installed on an inner surface of each of the holding portions of the sliding part along a direction orthogonal to a longitudinal direction of the rail member. The felt fills a gap between the inner surface and a peripheral surface of an end portion of the guide rail portion.

It is preferable to install the felt material on an entire inner surface of the holding portion. It is preferable to install the felt material separately at a plurality of positions of the inner surface of the holding portion in a longitudinal direction of the rail member. It is preferable to compose the sliding part of a pair of split parts and fix the split parts to each other, with the felt material sandwiched therebetween. It is preferable to impregnate the felt material with a lubricant.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
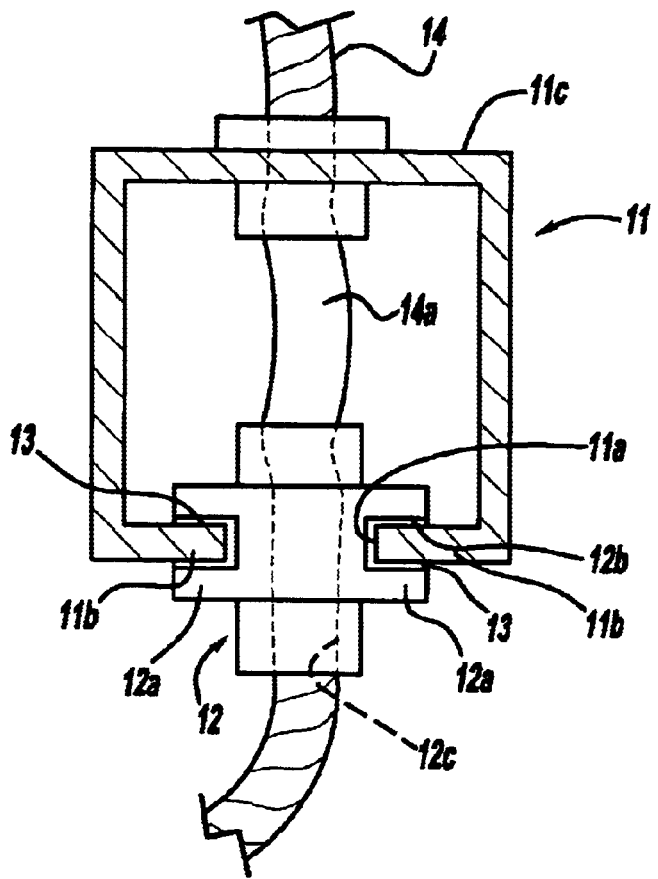
FIG. 1 is a sectional view showing main portions of a wire harness-wiring sliding part according to a first embodiment of the present invention.
Figure 2:
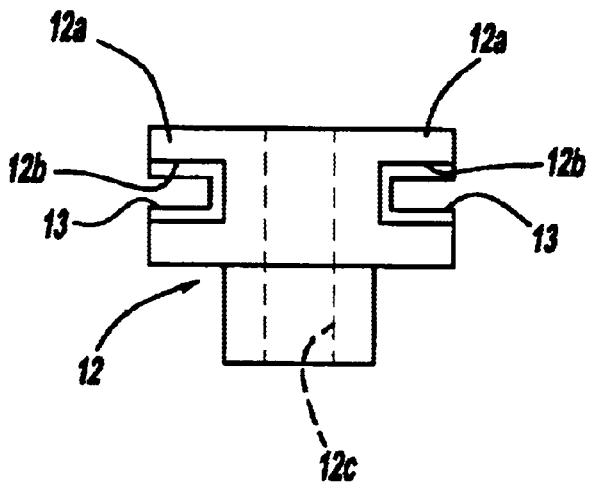
FIG. 2 is a front view showing the wire harness-wiring sliding part.
Figure 3:
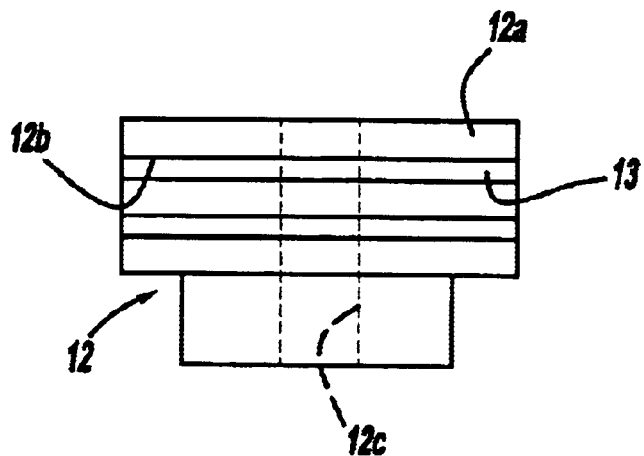
FIG. 3 is a side view showing the wire harness-wiring sliding part.

A first embodiment of the present invention will be described below with reference to the drawings. As shown in FIGS. 1 and 2, a rail member 1 is composed of a rectangular extruded metal material and has an expanding slot 1a. The slot has a predetermined width, extending longitudinally on one side surface, as described previously. At the position of the expanding slot 11a, the rail member 11 has a pair of flat guide rail portions 11b opposing one another at a predetermined interval.

A wire harness-wiring sliding part 12 is made of a metal material or a resinous material. As described previously, the sliding part 12 has a concave holding portion 12a on both its sides, holding edges of a pair of flat guide rail portions 11b. The edges of the flat guide rail portions 11b fit on the holding portion 12a, with the edges of the flat guide rail portions 11b opposing each other at the position of the expanding slot of the rail member 11. The holding portion 12a is slidable in a longitudinal direction of the guide rail portion 11b.

A felt material 13, made of wool or synthetic fiber, having a certain thickness is bonded with an adhesive agent to an inner surface 12b of each of the holding portions 12a of the sliding part 12. The felt 13 fills the gap between the inner surface 12b of each of the holding portions 12a and the peripheral surface of an end portion of the guide rail portion 11b. The sliding part 13 is orthogonal to the longitudinal direction of the rail member 11.

In the first embodiment, the felt material 13 is mounted on the entire inner surface 12b of each of the holding portions 12a. An insertion opening 12c with a certain diameter is formed at the center of the sliding part 12. A wire harness 14 can be inserted into the insertion opening 12c.

Similarly to the conventional construction, the rail member 11 is fixed to an appropriate position of the vehicle body. The sliding part 12, which is a moving member, is fixed to an appropriate position of the sliding door and is slidably mounted on both guide rail portions 11b, with the sliding part 12 striding over the guide rail portions 11b. By performing a sliding operation, the sliding part 12 slides along the longitudinal direction of the guide rail portions 11b.

A wire harness 14 extends from the vehicle body. The wire harness 14, via a grommet, is wired inside the rail member 11 through an insertion opening formed on a side surface 1c opposite to the expanding slot 11a. The wire harness 14 is wired from the inside of the rail member 11 to the sliding door through an insertion opening formed on the sliding part 12. A loose portion 14a of the wire harness 14 remains inside a space of the rail member 11. The length of the loose portion 14a is set so that a smooth sliding movement of the sliding part 12 is achieved in the longitudinal direction of the rail member 11.

The wire harness 14 inside the rail member 11 has a flat cable construction to make the wire harness 14 flexible. Thus the U-shaped loose portion 14a is formed inside the rail member 11.

The felt material 13 mounted on both holding portions 12a fills the gap between each guide rail portion 11b of the rail member 11 and each holding portion 12a of the sliding part 12. Accordingly, it is possible to effectively prevent the rail member 11 and the sliding part 12 from becoming loose. This reduces impact noise generated when the sliding part 12 slides along the rail member 11.

During sliding of the sliding part 12, the soft felt material 13 contacts the guide rail portion 11b. Thus it is possible to effectively reduce noise generated by sliding.

Further since the felt material 13 is mounted on the entire inner surface 12b of each of the holding portions 12a, it is possible to effectively prevent the rail member and the sliding part from becoming loose and effectively reduce impact generated noise.

By impregnating the felt material 13 with a lubricant, the sliding part 12 is capable of smoothly sliding along the rail member 11. Consequently it is possible to effectively reduce generation of sliding-caused noise and impact noise. Thus, it is possible to enhance the soundproofing effect.

Figure 4:
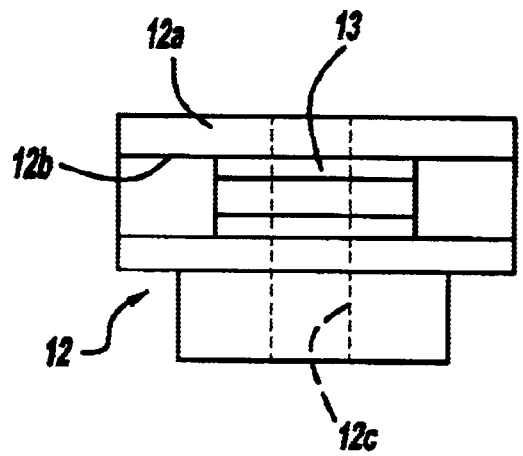
FIG. 4 is a side view showing a wire harness-wiring sliding part according to a second embodiment of the present invention.
Figure 5:
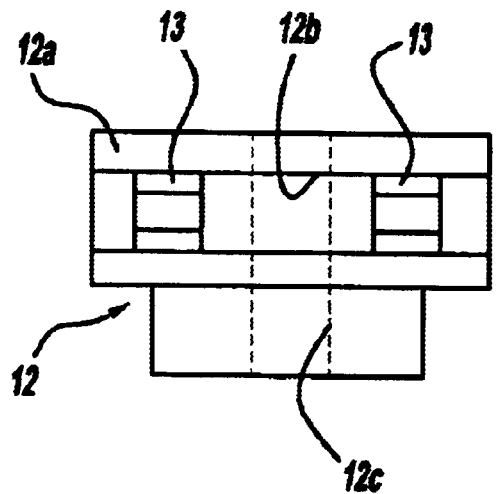
FIG. 5 is a side view showing a wire harness-wiring sliding part according to a third embodiment of the present invention.

FIGS. 4 and 5 show a second and a third embodiment, respectively, of the invention. Constituting parts of the second and third embodiments similar to those of the first embodiment are denoted by the same reference numerals as those of the first embodiment, and description is thus omitted.

In the second embodiment, the felt material 13 is not provided on all the inner surface 12b of the holding portion 12a in the longitudinal direction of a groove of the holding portion 12a. The felt material 13 is provided in a predetermined length in the center of the inner surface 12b of the holding portion 12a. In the third embodiment, the felt material 13 is provided separately at a plurality of positions (two in the third embodiment) on the inner surface 12b of the holding portion 12a in the longitudinal direction of the groove of the holding portion 12a.

Therefore similarly to the first embodiment, in the second and third embodiments, it is possible to reduce sliding-caused noise and impact noise and the amount of the felt material 13 used.

In the second and third embodiments, the position of the felt material and the number of pieces are determined appropriately independent of the moving member, such as the sliding door.

Figure 6:
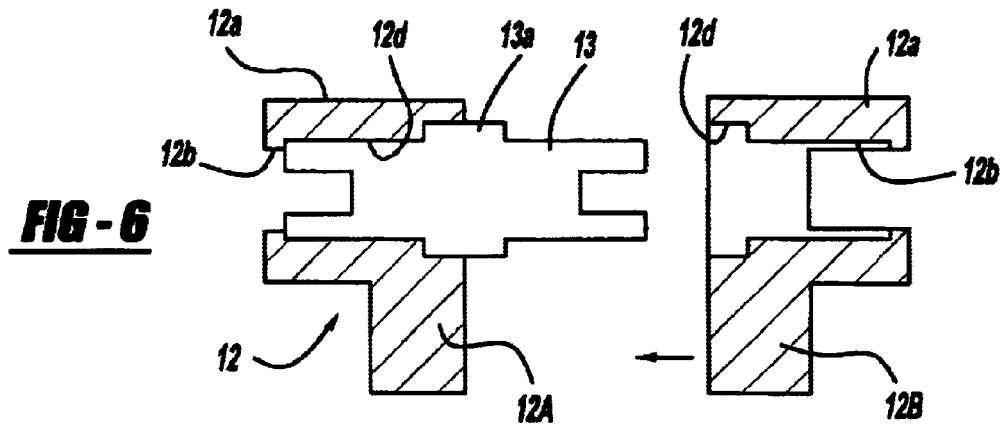
FIG. 6 is an exploded sectional view showing a wire harness-wiring sliding part according to a fourth embodiment of the present invention.
Figure 7:
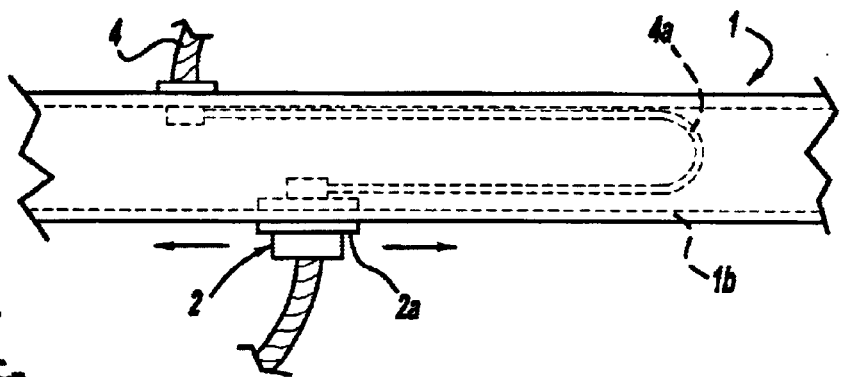
FIG. 7 is a schematic explanatory view showing the relationship between a rail member and a sliding part of a conventional wire harness-wiring sliding part.
Figure 8:
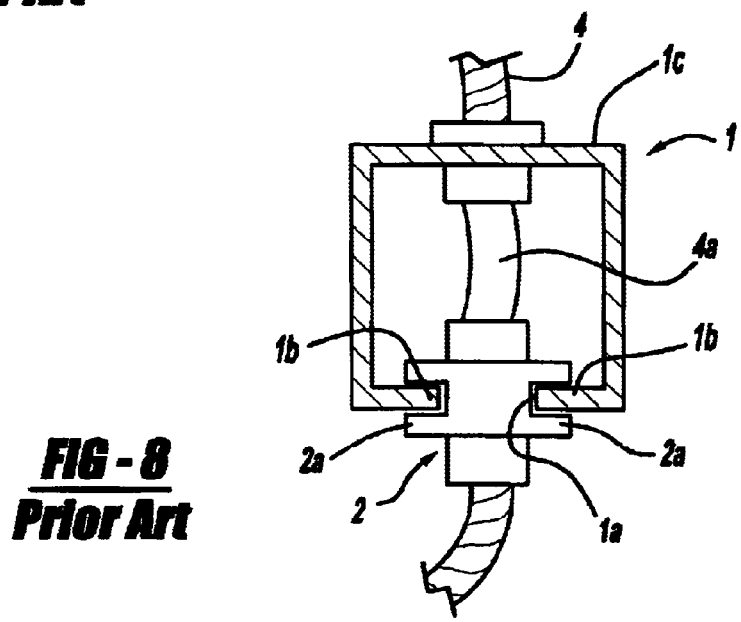
FIG. 8 is a sectional view showing main potions of the conventional wire harness-wiring sliding part.

FIG. 6 shows a fourth embodiment. Constituting parts of the fourth embodiment similar to those of the first embodiment are denoted by the same reference numerals as those of the first embodiment, and description is omitted.

In the fourth embodiment, the sliding part 12 is composed of a pair of split parts 12A and 12B. A felt accommodation cavity 12d is formed on each of the split parts 12A and 12B. The felt material 13 is accommodated in the felt accommodation concavity 12d. The felt material 13 fits on the holding portion 12a and strides over the split parts 12A and 12B.

The felt material 13 has a thick portion 13a thicker than other portions. When the split parts 12A and 12B are fixed to each other, the felt material 13 is sandwiched between the parts 12A, 12B. The felt material 13 is prevented from accidentally separating from the felt accommodation cavity 12d. The split parts 12A and 12B are fixed to each other with an adhesive agent or a screw.

Therefore similarly to the first embodiment, in the fourth embodiment, it is possible to reduce sliding-caused noise and impact noise. Further since the felt material 13 is sandwiched between the split parts 12A and 12B, the direction in which the felt material 13 separates from the felt accommodation cavity 12d and the sliding direction of the sliding part 12 are orthogonal to each other. Thus it is possible to prevent an accidental separation of the felt material 13 from the felt accommodation cavity 12d.

In the fourth embodiment, when the felt material 13 is provided almost entirely on the inner surface 12b of the holding portion 12a, the insertion opening 12c where the wire harness 14 is inserted is formed by making an opening through the thick portion 13a of the felt material 13. When the felt material 13 is formed separately at both ends of the inner surface 12b of the holding portion 12a in the longitudinal direction, as shown in FIG. 5, it is unnecessary to form an insertion opening 12c on the felt material 13.

Similarly to the first embodiment, in the second through fourth embodiments, the felt material 13 may be impregnated with a lubricant.

Instead of the extruded metal material, the rail member 11 may be a combination of a plurality of metal plates.

In addition to the sliding door construction of a vehicle, the wire harness-wiring sliding part may be provided between the body part of a continuous feeding system and its moving part. The moving part is operated to slide in a predetermined direction.

According to the wire harness-wiring sliding part of the present invention, the felt material is installed on the inner surface of each of the holding portions of the sliding part along the direction orthogonal to the longitudinal direction of the rail member. The felt fills the gap between the inner surface and a peripheral surface of the end portion of the guide rail portion. Consequently it is possible to effectively prevent the rail member and the sliding part from becoming loose and hence effectively reduce sliding-caused noise and impact noise.

Further, since the felt material is mounted on the entire inner surface of each of the holding portions, it is possible to effectively prevent the rail member and the sliding part from becoming loose. Accordingly, this effectively reduces generation of impact noise.

The felt material is provided separately at a plurality of positions of the inner surface of the holding portion in a longitudinal direction of the rail member. Thus it is possible to reduce the amount of felt material used and reduce manufacturing cost.

The sliding part is composed of a pair of split parts. The split parts are fixed to each other, with the felt material sandwiched between the split parts. In this case, it is possible to prevent an accidental separation of the felt material.

Since the felt material is impregnated with a lubricant, the sliding part is capable of smooth sliding. Therefore it is possible to effectively reduce the generation of sliding-caused noise and impact noise. Accordingly, this enhances the soundproofing effect.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wire harness-wiring sliding part comprising:

a sliding part and a rail member on which said sliding part is mounted, said rail member has a pair of opposing guide rail portions longitudinally disposed opposing one another at a predetermined distance;

said sliding part has a holding portion on both sides, which holds edges of said opposing guide rail portions and is longitudinally slidable on said guide rail portions and said sliding part is comprised of a pair of split parts and said split parts are fixed to each other;

a wire harness extending from a vehicle body is wired from a vehicle body provided with said rail member to a sliding door provided with said sliding part through said sliding part; and a felt material on an inner surface of each of said holding portions of said sliding part along a direction orthogonal to a longitudinal direction of said rail member, said felt material filling a gap between said inner surface and a peripheral surface of an end portion of said guide rail portion and said felt material being sandwiched between said split parts.

2. A wire harness-wiring sliding part according to claim 1, wherein said felt material is impregnated with a lubricant.

3. A wire harness-wiring sliding part comprising:

a sliding part and a rail member on which said sliding part is mounted, said rail member has a pair of opposing guide rail portions longitudinally disposed opposing one another at a predetermined distance;

said sliding part has a holding portion on both sides, which holds edges of said opposing guide rail portions and is longitudinally slidable on said guide rail portions and said sliding part is comprised of a pair of split parts and said split parts are fixed to each other;

a wire harness extending from a vehicle body is wired from a vehicle body provided with said rail member to a sliding door provided with said sliding part through said sliding part; and a felt material on an inner surface of each of said holding portions of said sliding part along a direction orthogonal to a longitudinal direction of said rail member, and said felt material is provided at a plurality of discrete positions of said inner surface of said holding portion in a longitudinal direction of said rail member, said felt material filling a gap between said inner surface and a peripheral surface of an end portion of said guide rail portion and said felt material sandwiched between said split parts.

* * * * *